Fig. 1.
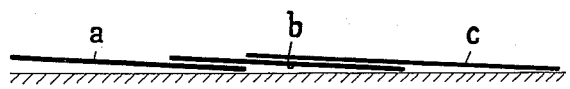
Fig. 1.ᵃ
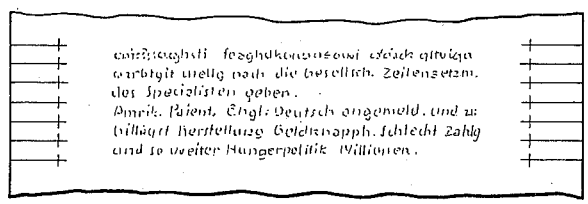
Fig. 1.ᵇ
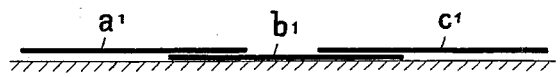

Nov. 24, 1925.          1,563,045
W. SCHAFFER
METHOD FOR PRODUCING SHEETS FOR PHOTOGRAPHIC REPRODUCTIONS,
REPRODUCTIONS BY REFLECTED LIGHT, AND THE LIKE
Filed Oct. 22, 1923          4 Sheets-Sheet 2
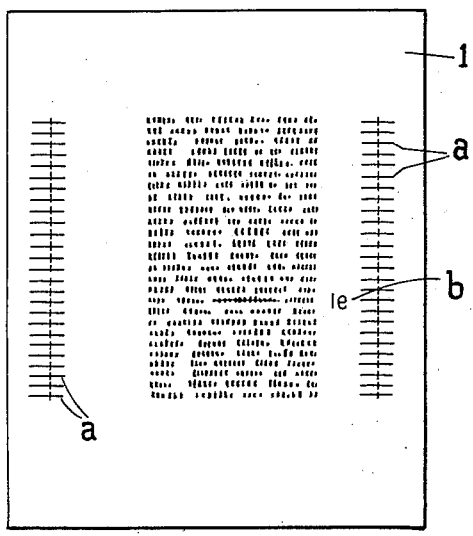
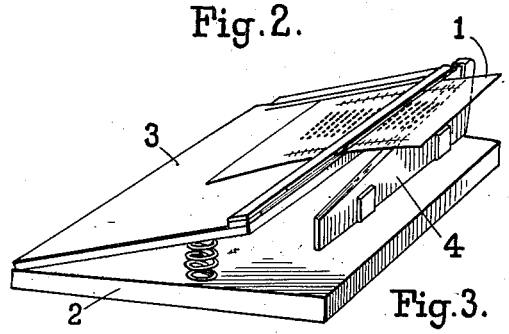
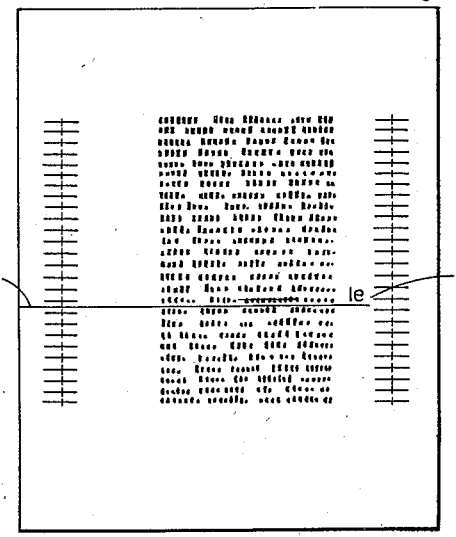
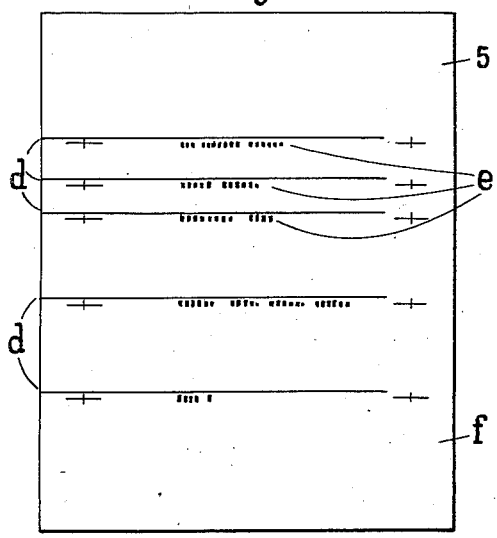
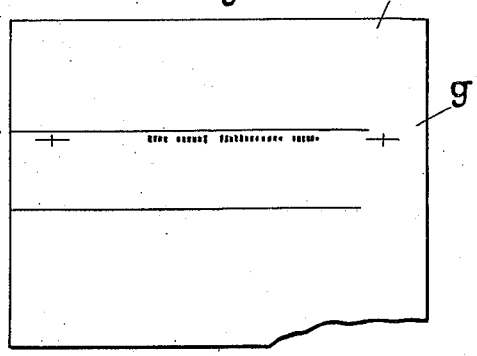
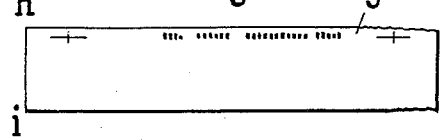
Inventor,
Werner Schäffer Nov. 24, 1925.                                                1,563,045
                        W. SCHAFFER
     METHOD FOR PRODUCING SHEETS FOR PHOTOGRAPHIC REPRODUCTIONS,
          REPRODUCTIONS BY REFLECTED LIGHT, AND THE LIKE
                    Filed Oct. 22, 1923        4 Sheets-Sheet 3

Inventor,
Werner Schäffer

Nov. 24, 1925.  1,563,045
W. SCHAFFER
METHOD FOR PRODUCING SHEETS FOR PHOTOGRAPHIC REPRODUCTIONS,
REPRODUCTIONS BY REFLECTED LIGHT, AND THE LIKE
Filed Oct. 22, 1923    4 Sheets-Sheet 4
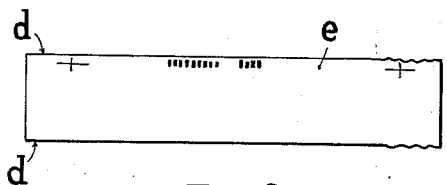
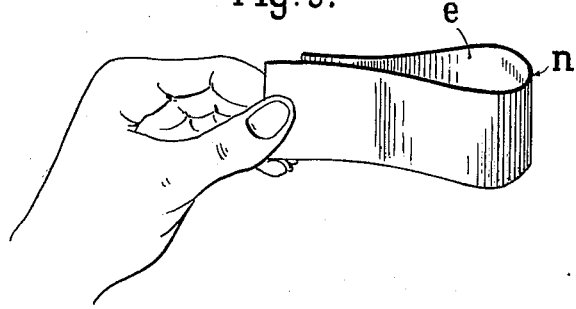
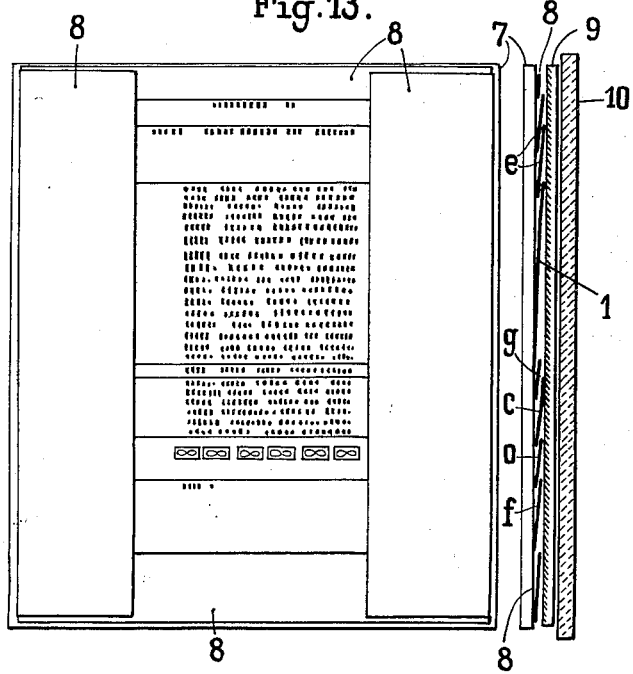
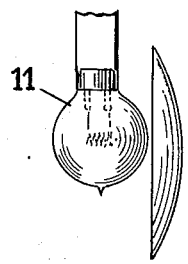

Patented Nov. 24, 1925.

1,563,045

UNITED STATES PATENT OFFICE.

WERNER SCHÄFFER, OF LAUPEN-BERN, SWITZERLAND, ASSIGNOR TO POLY-GRAPHISCHE GESELLSCHAFT, OF LAUPEN-BERN, SWITZERLAND.

METHOD FOR PRODUCING SHEETS FOR PHOTOGRAPHIC REPRODUCTIONS, REPRODUCTIONS BY REFLECTED LIGHT AND THE LIKE.

Application filed October 22, 1923. Serial No. 670,031.

*To all whom it may concern:*

Be it known that I, WERNER SCHÄFFER, residing at Laupen-Bern, Switzerland, have invented certain new and useful Improvements in Methods for Producing Sheets for Photographic Reproductions, Reproductions by Reflected Light and the like, of which the following is a specification.

This invention relates to a method of producing a reproduction sheet with a plurality of lines of characters and particularly for correcting reproduction sheets for reproductions by photography, more particularly for photographic reproductions with the aid of reflected light or the like. The invention also relates to a method of putting together elements of a reproduction sheet.

In a preferred method according to the invention faulty reproduction sheets are cut transversely and put together so that their different parts overlap. To correct a sheet in which a line or lines of characters are faulty through errors of composition or any other causes the reproduction sheet is cut transversely close to the wrong line or lines and correct lines are composed on a seperate sheet at suitable distances from each other and a strip or strips with the correct line or lines is, or are, cut from the separate sheet and inserted in the sheet to be corrected. Each inserted slip overlaps parts of the sheet into which it is inserted and is united therewith by any suitable means. Headings, sub-headings and the like which are to appear on the reproduction sheet are also preferably composed or printed at suitable distances from each other upon a separate sheet. The faulty sheets, the sheets upon which the corrected lines or paragraphs are written or printed, and the sheets with the titles, sub-titles and the like are not cut completely through, but a small uncut section is left at one edge of the sheet so that the different cuttings are held together at the uncut edge of the sheet. By this means the various parts or slips into which a sheet is cut are prevented from becoming mixed in a disorderly heap. All the incisions in a sheet may be made before the assembling operation is commenced and each slip may be detached from the incised sheet at the moment it is to be used.

In order to properly line up and straighten out the type which has been set, aligning marks are provided in accordance with the invention beside the lines registering with the spaces between the lines.

Another feature of the invention is making a middle vertical line of the base on which the parts are to be assembled. This middle line enables the headings, subheadings, page numbers chapter numbers and the lower and upper borders or ornamental designs and also the lines of ordinary print to be symmetrically arranged with respect to each other on the sheet. The middle point of the various parts, subparts, headings, subheadings, borders, etc., is determined by folding them together in such a way that the beginning and the end of the printed line or border register with each other thereupon. The sheet upon which the line or border is printed is tightly squeezed together at the middle so as to leave a visible crease or fold.

Other features of the invention are set forth in the following description and illustrated in the accompanying drawings.

The invention is shown by way of example in the drawings, in which,

Fig. 1 is a section showing parts of a reproduction sheet overlapping each other like roofing tiles or shingles;

Fig. 1ª is a detail face view of part of a reproduction sheet with aligning marks in the margins of the sheet;

Fig. 1ᵇ is a view similar to Fig. 1 showing a modified overlapping arrangement of parts of a sheet;

Fig. 1ᶜ is a face view of a reproduction sheet with a series of justified typewritten lines, there being an error in one of the said lines;

Fig. 2 is a perspective view of a device for making incisions in a reproduction sheet;

Fig. 3 is a view similar to Fig. 1ᶜ showing a reproduction sheet with an incision therein;

Fig. 4 shows a sheet on which titles and signatures for the pages are written;

Fig. 5 shows an incision sheet carrying a single correct line on a strip;

Fig. 6 is a detail view showing the strip that carries the single line disconnected from the remainder of the sheet;

Fig. 8 is a view similar to Fig. 6 showing a detached strip with a single line;

Fig. 9 is a detail perspective view illustrating the manual folding of a strip with a line according to Figs. 6 or 8;

Figs. 10 to 13 are views similar to Fig. 7 showing parts arranged upon the lined base in carrying out the invention; and Fig. 14 is a diagrammatic illustration of reflected light means for obtaining an impression from a finished reproduction sheet.

Figure 7:
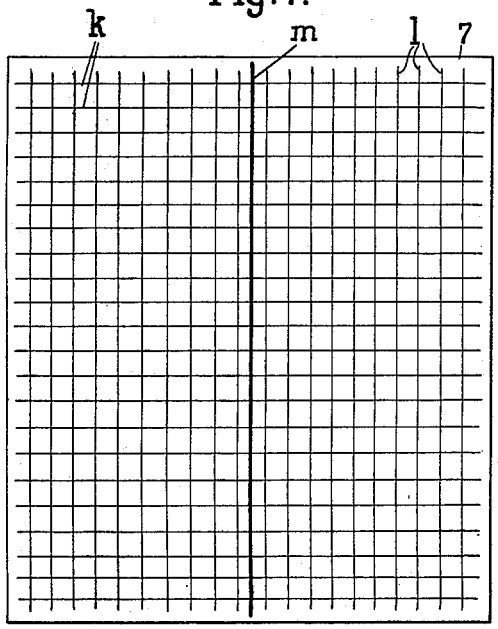
Fig. 7 is a face view of a cross-lined base used for putting together reproduction sheets in accordance with the method of the invention.

Referring to the drawings $a$ and $c$ in Fig. 1 are sections of a reproduction sheet which has been cut transversely, and $b$ is a slip with a correct line or lines of type or other characters thereon. The slip $b$ is inserted between the sections $a$ and $c$ so that the top margin of the slip $b$ lies above the section $a$ while its bottom margin lies beneath the section $c$. It is thus seen that the slips $b$ with the correct lines are inserted between the sections $a$ and $c$ like a roof shingle.

Fig. 1$^a$ is a front view of a section of a reproduction sheet. Aligning marks are made on the left and right margins of the sheet, these aligning marks consisting of crosses with short vertical lines placed in line above each other and long horizontal lines which register with the space between the printed lines on the sheet. In Fig. 1$^b$, the slip $b^1$ with the correct line or lines is joined to the sections $a^1$, $c^1$ of the reproduction sheet with its top and bottom margins beneath the ends of the sections $a^1$ and $c^1$.

An incision in a reproduction sheet that is to be corrected is made near or on the transverse or horizontal line of the corresponding aligning cross. The incision is preferably made beneath the incorrect line, and the slip with the correct line is inserted with its top margin above the incorrect line on the reproduction sheet. As the slips $b$ are of considerable width they do not become warped and creasy like a narrow strip whose width is equal to the height of a line type or letters.

As shown in Fig. 1$^c$ the reproduction sheet 1 carries a series of justified lines, which may be printed upon by means of a type-setting and writing machine or the like. $a$, $a$ are aligning marks or crosses as shown and described in Fig. 1$^a$. One of the lines of Fig. 1$^c$ contains a clerical error indicated thereon at a suitable point such as $b$. For correcting this error according to Fig. 3 an incision $c$ is made beneath the incorrect line, i. e. by means of a cutting device according to Fig. 2. This device is similar to those generally used with cutting photographic prints or the like and consists in a base plate 2, a second plate 3, hinged to the base plate 2 and a knife 4.

The reproduction sheet is secured to the hinged plate 3 by means of holding bars. The plate 3 then is moved downwards onto the knife 4 against the action of coil springs or the like between the plates 2 and 3. The knife is arranged in such a manner, that the sheet is not completely cut into separated pieces, but incisions only are made such as $c$, Fig. 3. The incorrect lines are rewritten on a separate sheet as shown in Fig. 5. The sheet 6 carries only one corrected line $g$ according to the incorrect line shown at $b$ in Fig. 1$^c$. Incisions $h$ and $i$ may be made into the sheet 6 in the manner above described, these incisions being taken adjacent to the upper part of the corrected line or lines. The rewritten correct line or lines are then disconnected from the sheet 6 by tearing off, so that a strip $g$ is formed as shown in Fig. 6.

The titles, pagings and the like are written on a separate sheet 5. All the titles, etc., are, as shown in Fig. 4, each begun at the left side of a column. The sheet 5 with the titles $e$ and the designation of the pages $f$, also shows at each side of a line an aligning cross. $d$ are incisions made adjacent to the upper part of the lines by means of the cutting device shown in Fig. 2.

After thus having prepared the typed matter, the latter must be put together. For this purpose a base 7 is used having horizontal lines $k$ and vertical lines $l$, and a prominent middle line $m$ as shown in Fig. 7. The typed matter now is composed or put together by placing the strips and sheets containing the titles, lines, etc., upon the cross-lined base in such a manner, that the middle of each part of the typed matter corresponds to the middle line $m$ of the base, Figs. 7 and 10 to 12. The middle of the lines is determined by folding the strips or sheets as shown in Fig. 9 so that the vertical parts of the aligning marks register with each other. A fold or crease is then made in the middle of these strips or sheets by squeezing the folded parts together. The titles and the like are folded in a similar manner but in this case the beginning and the end of the title, etc., itself, not the aligning marks are put one on the other before folding.

Figure 10:
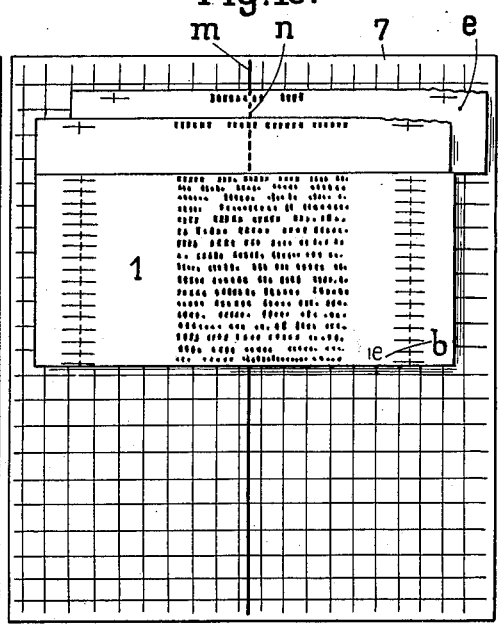
Figure 11:
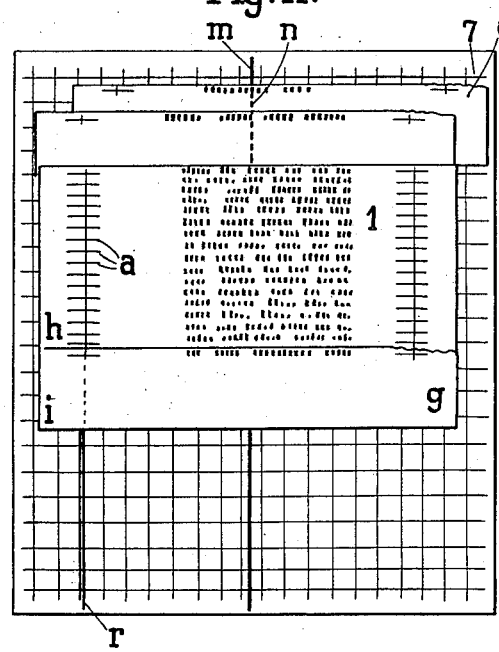
Figure 12:
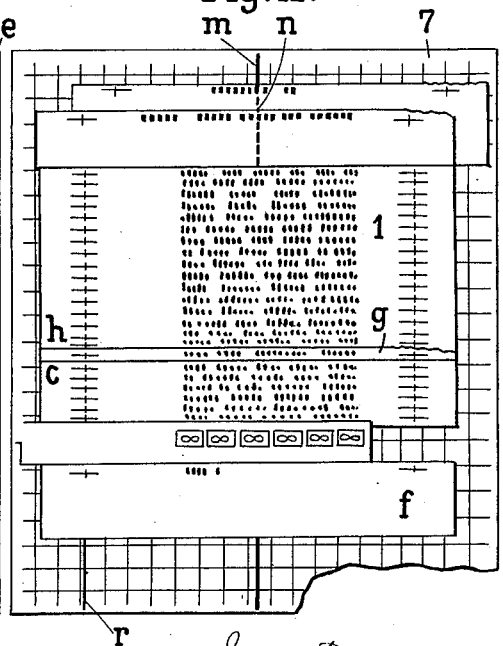

As shown in Fig. 10 a strip $e$ containing a title is first torn off from the sheet 5 and placed on the base 7 with its crease $n$ registering with the middle line $m$, the cut edges $d$ (Fig. 8) of the strip being placed just parallel to horizontal lines of the base. The following line-strip placed upon the base may be another line containing an undertitle also torn off from the sheet 5. If this line is, as indicated in Fig. 10, of a greater length than the first line $e$, the edges of this strip will not register with the edges of the first strip, while the middles of the titles and undertitle exactly register with each other and the middle line m. After the titles have been placed upon the base the upper part of the sheet 1 containing the text is turned off and also put on the base. Now a line r (Fig. 11) is drawn on the base, registering with the vertical parts of the aligning marks and the incorrect line b is covered by the strip g containing the correct rewritten line. In order to strictly adjust the correct line and the following parts of the text the auxiliary guiding line r may be used in connection with the vertical parts of the aligning marks a in the left margins. The edges of the incisions h and i must be exactly parallel to the horizontal lines of the base. The remaining part of the text sheet l is then placed upon the base in the manner described. A strip o, on which ornamentations are printed, and a strip f, on which the designation of the page is printed, may be placed upon the base at the bottom of the text in a desired distance and arrangement with regard to the other parts. As shown in Fig. 12 the strip o with the ornamentation is placed in such a manner that the middle of the ornamentation corresponds with the middle line m, while the beginning of strip f registers with the left edge of the column of the text. It is to be understood that all strips and sheets overlap each other in the manner shown in Fig. 1, the strip g with the correct line covering the incorrect line. Fig. 13 illustrates the manner of covering, by means of blank strips of paper, or by means of other suitable material such as color, all parts of the printed matter put together and not to be reproduced. From the finished reproduction sheet an impression may be made by means of reflecting light, as shown in Fig. 14, photography or the like. In Fig. 14 a sheet 10 of suitable material having a sensitized surface 9 is layed down upon the reproduction sheet, which has been put together in the manner described.

Claims:

1. In a method of producing a reproduction sheet with a plurality of lines of characters, cutting the sheet transversely, and inserting a strip with a correct line of characters so that the strip and the sheet overlap.

2. In a method of producing a reproduction sheet with a plurality of lines of characters for photographic reproduction, cutting the sheet transversely, and inserting a strip with a correct line of characters so that the strip and the sheet overlap.

3. In a method of producing a reproduction sheet with a plurality of lines of characters for photographic reproduction by reflected light, cutting the sheet transversely, and inserting a strip with a correct line of characters, so that the strip and the sheet overlap.

4. In a method of producing a reproduction sheet with a plurality of lines of characters, cutting the sheet transversely, preparing a second sheet with headings at suitable distances apart from each other, cutting a strip from the second sheet, and inserting the strip in the reproduction sheet.

5. In a method of producing a reproduction sheet with a plurality of lines of characters, cutting the sheet transversely beneath a line that is to be corrected, and inserting a strip with a correct line of characters so that the strip and the sheet overlap.

6. In a method of producing a reproduction sheet with a plurality of lines of characters, cutting the sheet transversely, preparing a second sheet with correct lines of characters at suitable distances apart from each other, making an incision in the second sheet from its one edge up to a distance from its opposite edge, detaching a strip adjacent to the incision from the second sheet, and inserting the strip in the reproduction sheet.

7. In a method of producing a reproduction sheet with a plurality of lines of characters, cutting the sheet transversely, preparing a second sheet with headings at suitable distances apart from each other, making an incision in the second sheet from its one edge up to a distance from its opposite edge, detaching a strip adjacent to the incision from the second sheet, and inserting the strip in the reproduction sheet.

8. In a method of producing a reproduction sheet with a plurality of lines of characters, applying aligning marks at a margin of the sheet, cutting the sheet transversely, and inserting a strip with a correct line of characters, the aligning marks registering with the spaces between the lines.

9. In a method of producing a reproduction sheet with a plurality of lines of characters, cutting the sheet transversely and inserting a strip with a correct line of characters, the cutting operation being performed by moving the sheet towards a stationary knife.

10. In a method of correcting reproduction sheets with a plurality of lines of characters, preparing a second sheet with correct lines of characters, and cutting the second sheet by moving it towards a stationary knife.

11. In a method of producing a reproduction sheet with a plurality of lines of characters, arranging lines formed by mechanical means on a sheet and making inscriptions, such as separation lines etc., manually on the sheet.

12. In a method of producing a reproduction sheet with a plurality of lines of characters, arranging lines formed by mechanical means on a sheet producing strips with ornamental lines, and placing the strips on the said sheet.

13. In a method of producing a reproduction sheet with a plurality of lines of characters, arranging lines formed by mechanical means on a sheet producing patches with ornamental designs, and placing the patches on the said sheet.

14. In a method of producing a reproduction sheet with a plurality of lines of characters, adjusting the parts to be assembled by means of a base with a middle line for indicating the relative positions of the said parts.

15. In a method of producing a reproduction sheet with a plurality of lines of characters, adjusting the parts to be assembled by means of a base with blue lines extending at right angles to each other for indicating the relative positions of the said parts to be assembled on the base.

16. In a method of producing a reproduction sheet with a plurality of lines of characters, adjusting the parts to be assembled by means of a base with a middle line for indicating the relative positions of the said parts, preparing strips with inscriptions thereon, folding the strips so that the ends of the inscriptions register with each other, and placing the strips on the base with their fold on the middle line.

17. In a method of producing a reproduction sheet with a plurality of lines of characters, adjusting the parts to be assembled by means of a base with a middle line for indicating the relative positions of the said parts, producing patches with numerals or the like thereon, and placing the patches on the base so that their numerals fall on the middle line.

18. In a method of producing a reproduction sheet with a plurality of lines of characters, adjusting the parts to be assembled by means of a base with lines extending at right angles to each other for indicating the relative positions of the said parts and covering unoccupied parts of the base.

19. In a method of producing a reproduction sheet with a plurality of lines of characters, adjusting the parts to be assembled by means of a base with lines extending at right angles to each other for indicating the relative positions of the said parts and covering unoccupied parts of the base with blank paper.

20. In a method of producing a reproduction sheet with a plurality of lines of characters, adjusting the parts to be assembled by means of a base with a middle line for indicating the relative positions of the said parts, preparing sheets with inscriptions thereon and with aligning marks at their margins, folding said sheet so, that its aligning marks register with each other, placing the folded sheet with its fold on the middle line, drawing a second line parallel to the middle line through an aligning mark, and aligning other sheets with the inscriptions on the base with the aid of their aligning marks and the second line.

In testimony whereof I have affixed my signature.

WERNER SCHÄFFER.